United States Patent
Loy et al.

(10) Patent No.: US 11,352,475 B2
(45) Date of Patent: Jun. 7, 2022

(54) METHOD OF FORMATION OF A ROBUST NETWORK OF FOAM THROUGH DIELS-ALDER REACTION

(71) Applicant: ARIZONA BOARD OF REGENTS ON BEHALF OF THE UNIVERSITY OF ARIZONA, Tucson, AZ (US)

(72) Inventors: Douglas A. Loy, Tucson, AZ (US); Robb E. Bagge, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 756 days.

(21) Appl. No.: 16/314,041

(22) PCT Filed: Jun. 29, 2017

(86) PCT No.: PCT/US2017/040098
§ 371 (c)(1),
(2) Date: Dec. 28, 2018

(87) PCT Pub. No.: WO2018/005864
PCT Pub. Date: Jan. 4, 2018

(65) Prior Publication Data
US 2020/0407528 A1    Dec. 31, 2020

Related U.S. Application Data

(60) Provisional application No. 62/356,150, filed on Jun. 29, 2016.

(51) Int. Cl.
*C08J 9/02* (2006.01)
*C08G 77/26* (2006.01)
*C09K 11/06* (2006.01)

(52) U.S. Cl.
CPC ............ *C08J 9/02* (2013.01); *C08G 77/26* (2013.01); *C09K 11/06* (2013.01); *C08J 2205/06* (2013.01); *C08J 2383/08* (2013.01); *C09K 2211/14* (2013.01)

(58) Field of Classification Search
CPC ...... C08J 9/02; C08J 2205/06; C08J 2383/08; C08G 77/26; C09K 11/06
See application file for complete search history.

(56) References Cited

U.S. PATENT DOCUMENTS

| | | | |
|---|---|---|---|
| 3,022,305 A | 1/1965 | Carboni | |
| 4,559,369 A | 12/1985 | Bauman | |
| 4,704,408 A | 11/1987 | Krug | |
| 5,034,463 A | 7/1991 | Brokken-Zijp et al. | |
| 6,534,611 B1 | 3/2003 | Darling et al. | |
| 6,866,045 B1 | 3/2005 | Maillard et al. | |
| 2004/0262217 A1 | 12/2004 | Mori et al. | |
| 2004/0266940 A1* | 12/2004 | Issari | C08L 101/00 524/500 |
| 2006/0263502 A1* | 11/2006 | Horsham | A23B 7/148 426/541 |
| 2009/0253015 A1 | 10/2009 | Onodera et al. | |
| 2009/0264544 A1 | 10/2009 | Loy | |
| 2010/0016545 A1 | 1/2010 | Wiessler et al. | |
| 2011/0171076 A1 | 7/2011 | Fansler | |
| 2013/0253120 A1 | 9/2013 | Kulkarni et al. | |
| 2013/0261272 A1 | 10/2013 | Herzog et al. | |
| 2014/0113844 A1 | 4/2014 | Haque et al. | |
| 2014/0371396 A1 | 12/2014 | Van Rheenen et al. | |

FOREIGN PATENT DOCUMENTS

| | | | |
|---|---|---|---|
| WO | WO2004047568 A1 | 6/2004 | |
| WO | WO2009134227 A1 | 11/2009 | |
| WO | WO2015121336 A1 | 8/2015 | |
| WO | WO-2015154078 A1 * | 10/2015 | ......... A61L 27/3886 |
| WO | WO2015154078 A1 | 10/2015 | |

OTHER PUBLICATIONS

Butts, M., Celia, J., Wood, C.D., Gillette, G., Kerboua, R., Leman, J., Lewis, L., Rajaraman, S., Rubinsztajn, S., Schattenmann, F., Stein, J., Wengrovius, J. and Wicht, D. (2003). Silicones. In Encyclopedia of Polymer Science and Technology, (Ed.), https://doi.org/10.1002/0471440264.pst338 (Year: 2003).*

Alge et al. Synthetically Tractable Click Hydrogels for Three-Dimensional Cell Culture Formed Using Tetrazine-Norbornene Chemistry. Biomacromolecules. 2013, 14, 949-953.

Desai et al. Versatile click alginate hydrogels crosslinked via tetrazineenorbornene chemistry. Biomaterials 50 (2015) 30-37.

Sukwon Jung and Hyunmin Yi. An Integrated Approach for Enhanced Protein Conjugation and Capture with Viral Nanotemplates and Hydrogel Microparticle Platforms via Rapid Bioorthogonal Reactions. Langmuir. 2014, 30, 7762-7770.

Kawamoto et al. Dual Role for 1,2,4,5-Tetrazines in Polymer Networks: Combining Diels-Alder Reactions and Metal Coordination to Generate Functional Supramolecular Gels. ACS Macro Lett. 2015, 4, 458-461.

Knall et al. Inverse electron demand Diels-Alder (iEDDA) functionalisation of macroporous poly(dicyclopentadiene) foams. Chem. Commun., 2013, 49, 7325.

Liu et al. Theoretical Elucidation of the Origins of Substituent and Strain Effects on the Rates of Diels-Alder Reactions of 1,2,4,5-Tetrazines. J. Am. Chem. Soc. 2014, 136, 11483-11493.

(Continued)

*Primary Examiner* — Michael M Dollinger
*Assistant Examiner* — Christina H. W. Rosebach
(74) *Attorney, Agent, or Firm* — Nguyen Tarbet LLC

(57) ABSTRACT

Organosilicon polymer foams are synthesized using a Carboni-Lindsey reaction of a tetrazine with a siloxane polymer having at least one of alkenyl or alkynyl functional groups. Optionally, the reaction may also comprise a second polymer having at least one of alkenyl or alkynyl functional groups. The organosilicon polymer foams may be crosslinked thermoset foams. The foams may be flexible or rubbery.

20 Claims, No Drawings

(56) References Cited

OTHER PUBLICATIONS

Liu et al. Modular and orthogonal synthesis of hybrid polymers and networks. Chem. Commun., 2015, 51, 5218.

Fork et al. Molecular Dynamics of the Diels-Alder Reactions of Tetrazines with Alkenes and N2 Extrusions from Adducts. J. Am. Chem. Soc. 2015, 137, 4749-4758.

Zhang et al. Interfacial Bioorthogonal Cross-Linking. ACS Macro Lett. 2014, 3, 727-731.

Vazquez et al. Mechanism-Based Fluorogenic trans-Cyclooctene-Tetrazine Cycloaddition. Angew. Chem. Int. Ed. 2017, 56, 1334-1337.

Heldmann et al. Synthesis of Metallated (Metal = Si, Ge, Sn) Pyridazines by Cycloaddition of Metal Substituted Alkynes to 1,2,4,5-Tetrazine. Tetrahedron Letters, vol. 38, No. 33, pp. 5791-5794, 1997.

Sauer et al. 1,2,4,5-Tetrazine: Synthesis and Reactivity in [4+2] Cycloadditions. Eur. J. Org. Chem. 1998, 2885-2896.

Kang, JW et al. Low-Loss Fluorinated Poly(Arylene Ether Sulfide) Waveguides with High 12.33Thermal Stability. Journal of Lightwave Technology. vol. 19. No. 6. Jun. 2001, pp. 872-875.

Loy D.A., Tetrazines for hydrogen storage. 59-th Annual Report on Research 2014 [online]. 55-57 Report 50941-ND7. 2014 (2014) [retrieved on Aug. 30, 2017). retrieved from the Internet: <https:l-lacswebcontent.acs.org/prfar/2014/Paper13084.html>. pp. 1-5.

Al-Malaika, S. In Reactive antioxidants for polymers, 1997; Blackie: 1997; pp. 266-302.

Heim, K. C. Natural polyphenol and flavonoid polymers. In: Cirillo G, Iemma F, eds. Antioxidant Polymers: Synthesis, Properties and Applications. Hoboken, NJ: Scrivener Publishing LLC and John Wiley & Sons Ltd; 2012, pp. 23-54.

Lei, H.; Huang, G.; Weng, G., Synthesis of a New Nanosilica-Based Antioxidant and Its Influence on the Anti-Oxidation Performance of Natural Rubber. J. Macromol. Sci, Part B: Phys. 2013, 52, (1), 84-94.

Solera, P., New trends in polymer stabilization. J. Vinyl Addit. Technol. 1998, 4, (3), 197-210.

Cerna, A.; Cibulkova, Z.; Simon, P.; Uhlar, J.; Lehocky, P., DSC study of selected antioxidants and their binary mixtures in styrene-butadiene rubber. Polym. Degrad Stab. 2012, 97, (9), 1724-1729.

Jaiswal, S.; Varma, P. C. R.; O'Neill, L.; Duffy, B.; McHale, P., An investigation of the biochemical properties of tetrazines as potential coating additives. Mat Sci Eng C-Mater 2013, 33, (4), 1925-1934.

Polezhaev, A. V.; Maciulis, N. A.; Chen, C.-H.; Pink, M.; Lord, R. L.; Caulton, K. G., Tetrazine Assists Reduction of Water by Phosphines: Application in the Mitsunobu Reaction. Chem.—Eur. J. 2016, 22, (39), 13985-13998.

Audebert, P.; Sadki, S.; Miomandre, F.; Clavier, G., First example of an electroactive polymer issued from an oligothiophene substituted tetrazine. Electrochem Commun 2004, 6, (2), 144-147.

Fukuzumi, S.; Yuasa, J.; Suenobu, T., Scandium Ion-Promoted Reduction of Heterocyclic N:N Double Bond. Hydride Transfer vs Electron Transfer. J. Am. Chem. Soc. 2002, 124, (42), 12566-12573.

International Search Report Issued for PCT Application No. PCT/US16/46199 dated Jan. 26, 2017.

International Search Report Issued for PCT Application No. PCT/US17/24702 dated Jun. 27, 2017.

International Search Report Issued for PCT Application No. PCT/US17/25110 dated Jun. 22, 2017.

International Search Report Issued for PCT Application No. PCT/US17/40098 dated Sep. 29, 2017.

Knall, Chem. Commun., 2013, 49, p. 7325-7327 (Year: 2013).

\* cited by examiner

METHOD OF FORMATION OF A ROBUST NETWORK OF FOAM THROUGH DIELS-ALDER REACTION

CROSS-REFERENCES TO RELATED APPLICATIONS

This application is a 371 and claims benefit of PCT/US2017/040098 filed Jun. 29, 2017, which claims benefit of U.S. Provisional Application No. 62/356,150 filed Jun. 29, 2016, the specification(s) of which is/are incorporated herein in their entirety by reference.

FIELD OF THE INVENTION

The present invention relates to organosilicon polymer foams formed by the Carboni-Lindsey reaction of tetrazines with unsaturated siloxane polymers or oligomers.

BACKGROUND OF THE INVENTION

Polymer foams are widely used for packaging, insulation, cushioning and other applications. To generate polymer foams, chemical or physical blowing agents are used. Chemical blowing agents are chemicals that take part in a reaction or decompose, giving off gaseous chemicals in the process. Physical blowing agents are gases that do not react chemically in the foaming process and are therefore inert to the polymer forming the matrix. Certain blowing agents such as chlorofluorocarbons (CFC's) have lost popularity as a result of their negative environmental impact. Polyurethane foams are known to release the major greenhouse gas $CO_2$ in the foaming process.

The present invention describes an alternative method of making organosilicon foams that involve the use of a newly discovered class of chemical blowing agent, tetrazines. The materials in this invention disclosure differ from polyurethanes in that they do not rely on the use of isocyanates for their creation, and provide an alternative method to generate foams without the occupational hazards of working with the known sensitizers (isocyanates). When mixed with an unsaturated polymer or oligomer, the tetrazine undergoes an irreversible Carboni-Lindsey cycloaddition reaction and releases nitrogen gas through cheletropic elimination that results in foam formation. The foams are similar to polyurethane in that a reaction between a mixture of reagents results in gas generation and polymer modification providing a networked foam. These new materials differ from polyurethanes in that they provide a novel approach to making diverse new class of organosilicon foams as long as the oligosiloxane or polysiloxane contains units functionalized with alkene or alkyne moieties. The chemistry can also be combined with a previous disclosure of ours to create copolymer blended foam networks by combining the alkene/alkyne functionalized oliosiloxane/polysiloxane with one or more oligoenes/polyenes and reacting with tetrazines. This provides an opportunity to tailor the material properties of these new copolymer foams by altering the feed ratio of one or more of the oligomers or polymers in the blend.

SUMMARY OF THE INVENTION

The present invention discloses a method of making a robust network of organosilicon foams by reacting a tetrazine component and a polymer component, wherein the polymer component comprises an alkene or an alkyne substituted polysiloxane component. In some preferred embodiments, a polysiloxane component is pre-mixed with a polyene component before reaction with the tetrazine component.

According to some embodiments, the method comprises adding a polyene component and a polysiloxane component in a reaction vessel. A tetrazine component was added to the same reaction vessel. The tetrazine component, the polyene component and the polysiloxane component were mixed to form a composition through a Diels-Alder reaction. The tetrazine component performs as a diene of the Diels-Alder reaction. The alkene or the alkyne substituted polysiloxane component performs as a dienophile of the Diels-Alder reaction.

A novel feature of the present invention is that the tetrazine acts as a chemical foaming agent, and releases nitrogen gas through a Carboni-Lindsey cycloaddition during the formation of the organosilicon foams unlike carbon dioxide gas which is produced as a byproduct during the formation of polyurethane based foams. Therefore, the chemistry involved in the present invention provides a greener alternative to other foams currently being produced and contribute towards reducing the global warming caused by conventional foam based chemistry. The organosilicon foams of the present invention shares properties of each separate starting material used in the Diels-Alder reaction. Also, since the tetrazine is acting as the chemical blowing agent for the organosilicon foams in the present invention, the foams can be generated without the need of isocyanates (such as toluene diisocyante (TDI)), which are compounds that have established occupational exposure limits due to being potent sensitizers. The organosilicon foams in this present invention can be made with and without the need of additional chemical or physical blowing agents, similar to the preparation of polyurethane based foams, but are unique in that they can be mixed with other oligoenes/polyenes (for example: polybutadiene) to create novel copolymer hybridized foam networks.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

As used herein, the terms "organosilicon" and "siloxane" refer to a compound or polymer which contains C—Si bonds. Non-limiting examples of organosilicon polymers include polydimethylsiloxane, silicones, silicone oils, and any of their functionalized derivatives.

As used herein, the term "unsaturated" refers to a compound or polymer that has double or triple carbon-carbon bonds. These bonds may be pendant or in the polymer backbone.

According to one embodiment, the present invention discloses a method of making polymer foams. In some embodiments, the method comprises reacting a tetrazine monomer and a polymer having at least one of alkenyl or alkynyl functional groups, wherein the tetrazine comprises a 3,6-disubstituted-1,2,4,5-tetrazine of the following structure:

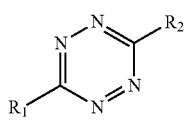

wherein $R_1$ and $R_2$ may each be a hydrogen, alkyl, aryl, halide, heteroaromatic, ester, amide, nitrile, alkoxy, amine or sulfide functional group.

In some embodiments, at least one of the $R_1$ and $R_2$ alkyl substituents comprises hydrogen, methyl, ethyl, isopropyl, octadecyl, 2-octyl, 2-hexyl, hexyl or octyl. In some embodiments, the aryl of at least one of the $R_1$ and $R_2$ substituents comprises phenyl or biphenyl. In some embodiments, the heteroaromatic of at least one of the $R_1$ and $R_2$ substituents comprises furan, pyrrole, pyridyl or thiophene. In some embodiments, the ester of at least one of the $R_1$ and $R_2$ substituents comprises methyl ester, ethyl ester, isopropyl ester, amide or nitrile. In some embodiments, the amine of at least one of the $R_1$ and $R_2$ substituents comprises hydrazine, pyrazoles, pyrrole, acyl amino or amino pyridines. In some other embodiments, the sulfide of at least one of the $R_1$ and $R_2$ substituents comprises thioalkyls or thiophenes.

In one embodiment, the present invention features a method of forming an organosilicon polymer foam. The method may comprise providing a siloxane polymer having at least one of alkenyl or alkynyl functional groups; providing one or more tetrazine monomers, wherein the tetrazine monomers are 3,6-disubstituted-1,2,4,5-tetrazines; and mixing the one or more 1,2,4,5-tetrazine monomers with the siloxane polymer, wherein the tetrazine monomers react with at least one of the alkenyl or alkynyl functional groups of the siloxane polymer to produce an organosilicon polymer foam.

In preferred embodiments, the tetrazine monomers react with at least one of alkenyl or alkynyl functional groups of the siloxane polymer via a Carboni-Lindsey reaction.

In some embodiments, the present invention features a polymer foam. In selected embodiments, the polymer foam may be configured for use as insulation, packaging, support or cushioning. In other embodiments, the polymer foam may be configured for use as a replacement or substitute for polyurethane foams or silicone foams.

According to some embodiments, the substituents at the 3 and 6 positions of the tetrazine monomers are each selected from the group containing alkyl, aryl, halide, heteroaromatic, ester, nitrile, amide, alkoxy, amine and sulfide substituents. In further embodiments, the halide substituent may be a fluorine, a chlorine, a bromine, or an iodine substituent.

According to preferred embodiments, the organosilicon polymer foam may be formed at a temperature range of about 0-225° C., or any range in between. In other preferred embodiments, the organosilicon polymer foam may be formed in about 30 seconds to about 60 min. Without wishing to limit the invention to a particular theory or mechanism, the time of the reaction may depend on one or more of the following factors: the concentrations of the silicone and the tetrazine, the nature of the tetrazine substituents, the number of alkene or alkyne groups on the polysiloxane or the temperature.

In some embodiments, an organosilicon polymeric foam may be flexible or rubbery. In other embodiments, the foam may be fluorescent. In one embodiment, the foam may be a rigid foam.

In some embodiments, the tetrazine monomer may be soluble in or miscible with the siloxane polymer. In other embodiments, the tetrazine monomer may not be soluble in the siloxane polymer and a solvent may be required for the reaction.

As a non-limiting example, a modified organosilicon polymer may be prepared from: a siloxane polymer having at least one of alkenyl or alkynyl functional groups; and one or more tetrazine monomers, wherein the tetrazine monomers are 3,6-disubstituted-1,2,4,5-tetrazines; wherein the tetrazine monomers react with at least one of the alkenyl or alkynyl functional groups of the siloxane polymer to form said modified organosilicon polymer.

In some embodiments, the present invention affords a modified organosilicon polymer. In further embodiments, the modified organosilicon polymer is an elastomeric polymer foam. In further embodiments, the modified organosilicon polymer is an thermoplastic polymer foam. In still further embodiments, the present invention yields a thermoset foam.

In another embodiment, a non-limiting example of forming an organosilicon foam may comprise providing an unsaturated polymer having at least one of alkenyl or alkynyl functional groups, providing a siloxane polymer having at least one of alkenyl or alkynyl functional groups, and providing one or more tetrazine monomers. The tetrazine monomers may be 3,6-disubstituted-1,2,4,5-tetrazines and the one or more 1,2,4,5-tetrazine monomers may be mixed with at least one of the unsaturated or siloxane polymers. The tetrazine monomers may react with the at least one of alkenyl or alkynyl functional groups of at least one of the unsaturated or siloxane polymers to produce a polymer foam.

According to some embodiments, the tetrazine monomers is with the unsaturated polymer in addition to the siloxane polymer. The unsaturated polymer may be premixed with the siloxane polymer before one or more tetrazine monomers is reacted with the premixed polymers. Both the unsaturated polymer and the siloxane polymer may comprise at least one of alkenyl or alkynyl functional groups. Without wishing to limit the invention to a particular theory or mechanism, at least one of the alkenyl or alkynyl functional groups may react with one or more tetrazine monomers via a Carboni-Lindsey reaction. In other embodiments, the unsaturated polymer may have alcohol, amine or thiol functional groups.

According to one preferred embodiment, one or more tetrazine monomers may react via a nucleophilic substitution reaction. For a non-limiting example, the substituents at the 3 and 6 positions of tetrazine monomers may be halide substituents and a crosslinked or thermoset network may be formed by nucleophilic substitution of one or more of the halide substituents by a nucleophilic functional group of an unsaturated polymer such as an alcohol, amines or thiols.

In some embodiments, a modified organosilicon polymer may be prepared from an unsaturated polymer having at least one of alkenyl or alkynyl functional groups, a siloxane polymer having at least one of alkenyl or alkynyl functional groups, and one or more tetrazine monomer. The tetrazine monomers may be 3,6-disubstituted-1,2,4,5-tetrazines. The tetrazine monomers can react with the at least one of the alkenyl or alkynyl functional groups of the at least one of the unsaturated or siloxane polymers to form said modified organosilicon polymer.

As a non-limiting example, a modified organosilicon polymer may be prepared from an unsaturated polymer having at least one of alkenyl or alkynyl functional groups, a siloxane polymer having at least one of alkenyl or alkynyl functional groups, and one or more tetrazine monomers. The tetrazine monomers may be 3,6-disubstituted-1,2,4,5-tetrazines. The unsaturated polymer can be premixed with the siloxane polymer, and the tetrazine monomers react with the at least one the alkenyl or alkynyl functional groups of at least one of the unsaturated or siloxane polymers to form said modified organosilicon polymer. In some embodiments, the substituents at the 3 and 6 positions of the tetrazine monomers are halide substituents, through which a crosslinked thermoset foam is formed by nucleophilic substitution of one or more of the halide substituents by a nucleophilic functional group of the unsaturated polymer.

According to a preferred embodiment, the ratio of the tetrazine monomer to the alkene or alkyne groups of the siloxane or unsaturated polymer may be at least about 1:50. In other embodiments, the ratio of the tetrazine monomer to the alkene or alkyne groups of the siloxane or unsaturated polymer may be about 1:40, 1:30, 1:20, 1:10, 1:5, 1:2, 1:1, 2:1, 5:1, 10:1, 20:1, 30:1, 40:1 or 50:1

In some embodiments, the number of alkene or alkyne groups per polymer repeat unit of the siloxane polymer ranges from 2 to 200 mol %. In other embodiments, the number of alkene or alkyne groups per polymer repeat unit may range from about 2-5 mol %, 5-10 mol %, 10-25 mol %, 25-50 mol %, 50-75 mol %, 75-100 mol %, 100-125 mol %, 125-150 mol %, 150-175 mol % or 175-200 mol %. In preferred embodiments, at least 2 mol % of the alkene or alkyne groups may react with a tetrazine monomer to generate nitrogen gas. In other embodiments, about 2-5 mol %, 5-10 mol %, 10-25 mol %, 25-50 mol %, 50-75 mol %, 75-100 mol %, 100-125 mol %, 125-150 mol %, 150-175 mol % or 175-200 mol % of the alkene or alkyne groups may react with a tetrazine monomer to generate nitrogen gas.

Without wishing to limit the invention to a particular theory or mechanism, at least 2 mol % alkene or alkyne groups per repeat unit of polymer is required for sufficient nitrogen to be evolved (by reacting with an equal number of tetrazine molecules-2 mol % relative to the monomer repeat unit) to create a foam. For example, a minimum of two alkene groups on a polymer a hundred monomer units in length is the lowest ratio in order to form the foam. In some embodiments, at least 2 mol % alkene or alkyne groups per repeat unit of polymer and at least 2 mol % tetrazine per repeat unit of polymer is required in order to prepare a foam. In other embodiments, the ratio can range up to about 200 mol % alkene or alkyne groups per silicone polymer, i.e. two alkene or alkyne groups for every silicon repeat unit in the polymer. Again, without wishing to limit the invention to a particular theory or mechanism, by increasing the ratio alkene or alkyne groups, then more tetrazine can react and more nitrogen can be generated.

According to other embodiments, the invention features a method of forming a foam by reacting tetrazine monomers and a polymer component. In one embodiment, two or more of the tetrazine monomers are covalently linked by an organic functional group, an oligomer or a polymer chain. As a non-limiting example, wherein the linked tetrazine monomers may comprise one of the following structures:

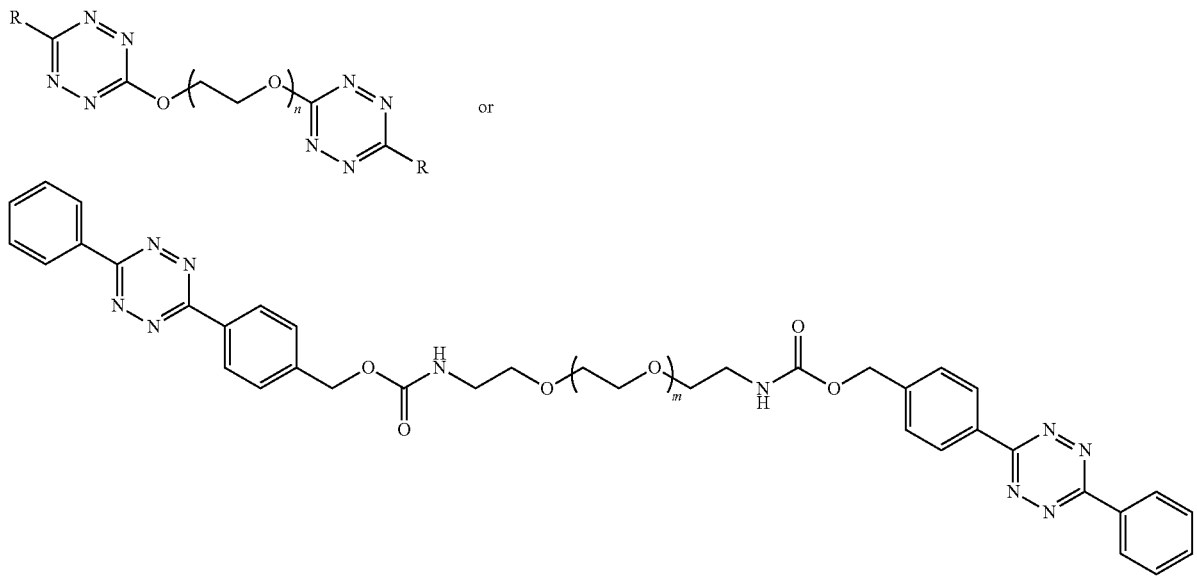

wherein n and m each range from 1-5000.

In some embodiments, the linked tetrazine monomers may provide ability for crosslinking of the foam. Without wishing to limit the invention to a particular theory or mechanism, this may improve pore uniformity, decrease or prevent pore collapse, and improve overall mechanical properties of the foams.

In some embodiments, the siloxane polymer comprises at least one or more of the following structures:

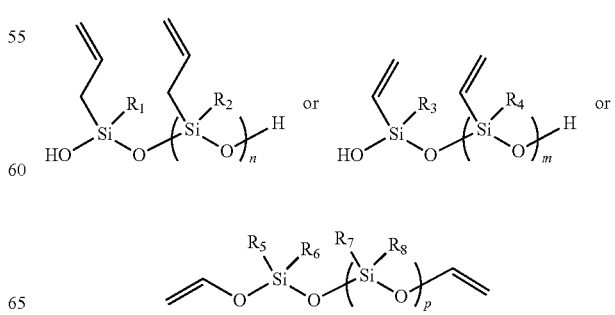

wherein $R_1$, $R_2$, $R_3$, $R_4$, $R_5$, $R_6$, $R_7$, and $R_8$ may each be selected an alkyl, aryl, halide, heteroaromatic, hydrogen, alkoxy or hydroxyl substituent, and n, m and p may each range from about 1-50,000.

In some embodiments, the alkyl of $R_1$-$R_8$ comprises methyl, ethyl, propyl or isopropyl. In some other embodiments, the aryl of the $R_1$-$R_8$ substituents comprises phenyl, biphenyl, furan or pyrrole. In some embodiments, the heteroaromatic of the $R_1$-$R_8$ substituents comprises furan, pyrrole or thiophene. In some embodiments, the halide of the $R_1$-$R_8$ substituents comprises fluoride, chloride, bromide or iodide.

In some embodiments, the present invention comprises modified organosilicon polymers. As a non-limiting example, the modified organosilicon polymer may comprise:

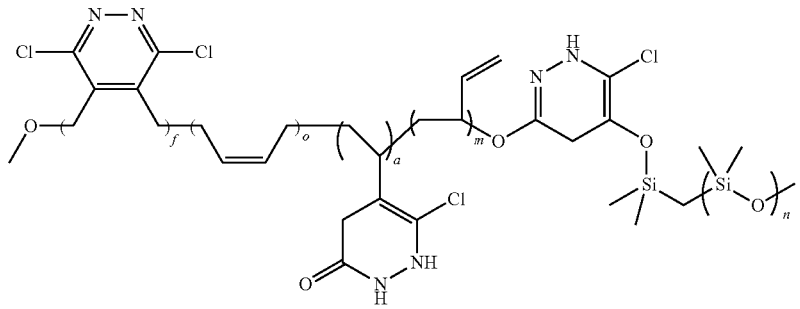

wherein f and a are each at most about 12,500, and o and m can range from about 1-24,999.

As another non-limiting example, the modified organosilicon polymer may comprise:

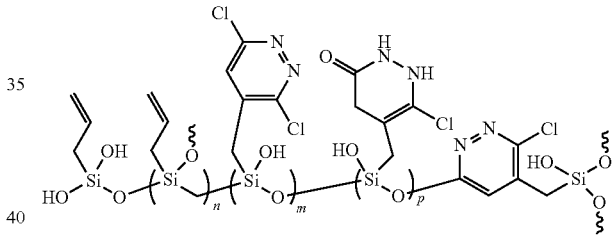

wherein n is at most about 49,999, and m and p are each at most about 10,000.

In one embodiment, a modified organosilicon polymer may react with water to form pyridazinone or pyridazanone functional groups.

Scheme 1. Non-limiting example of a reaction schematic for a Carboni-Lindsey reaction among 3,6-disubstituted-1,2,4,5-tetrazines, a hydroxy substituted polybutadiene and a vinyl terminated polydimethylsiloxane (PDMS).

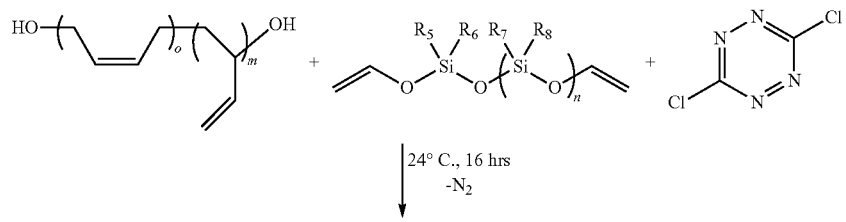

wherein f, o, a and m each range from about 1-50,000.

Scheme 2. Non-limiting example of a reaction schematic for a Carboni-Lindsey reaction between 3,6-disubstituted-1,2,4,5-tetrazines and polyallylsiloxane wherein x, n, m and p each range from about 1-50,000.

Scheme 3. Non-limiting example of a reaction schematic for a Carboni-Lindsey reaction between 3,6-disubstituted-1,2,4,5-tetrazines and a substituted polyallylsiloxane.

wherein $R_1$ and $R_2$ are each selected from a group containing halide, alkyl, aryl, heteroaromatic, hydrogen, alkoxy, nitrile, amide, ester, and hydroxy substituents, and wherein x, n, m and p each range from about 1-50,000.

Scheme 4. Non-limiting example of a reaction schematic for a Carboni-Lindsey reaction between 3,6-disubstituted-1,2,4,5-tetrazines and a substituted polyvinylsiloxane.

wherein $R_1$ and $R_2$ are selected from a group containing halide, alkyl, aryl, heteroaromatic, hydrogen, alkoxy, hydroxy, ester, amino, sulfide and polymer substituents, $R_3$ is selected from a group containing hydrogen, halide, nitrite, ester, amide, ether, amines, thiol ether, alkyl, aryl, heteroaromatic, and wherein n ranges from about 1-50,000.

Scheme 5. Non-limiting example of a reaction schematic for a Carboni-Lindsey reaction between 3,6-disubstituted-1,2,4,5-tetrazines and a different substituted polyvinylsiloxane.

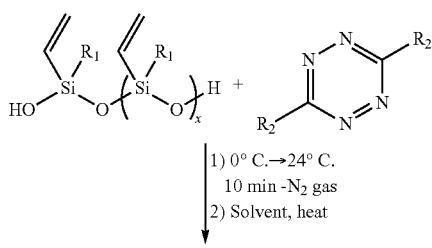

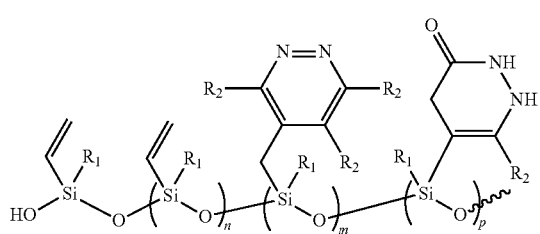

wherein $R_1$ is selected from a group containing halide, alkyl, aryl, heteroaromatic, hydrogen, alkoxy, hydroxy, and polymer substituents, $R_2$ is from a group containing hydrogen, halide, nitrile, ester, amide, ether, amines, thiol ether, alkyl, aryl, heteroaromatic, polymer substituents, and x, n, m and p each range from about 1-50,000.

Scheme 6. Non-limiting example of siloxane polymers that would react 1:1 with 2 mol % tetrazine monomer (relative to the number of siloxane repeat units).

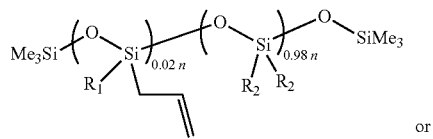

or

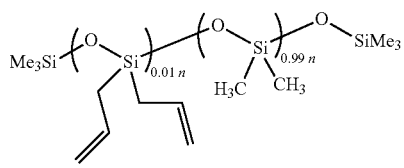

Scheme 7. Non-limiting reaction scheme for a Carboni-Lindsey reaction between a polymer with two alkene groups per repeat unit and 2 mol % tetrazine monomer.

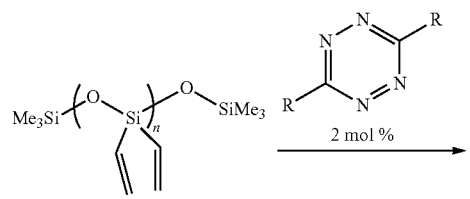

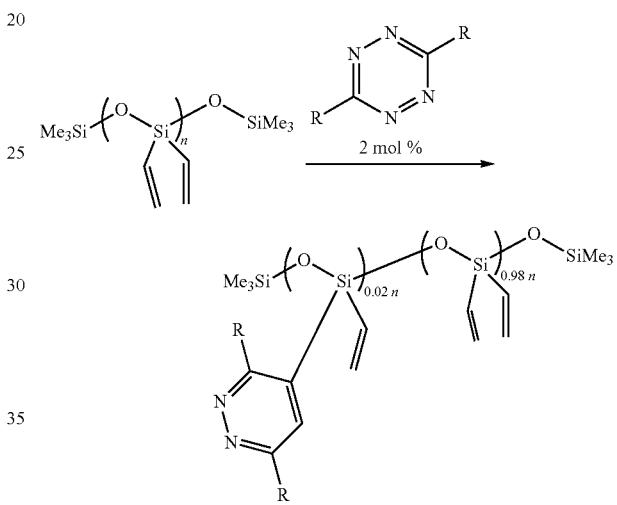

Scheme 8. Non-limiting reaction scheme for a Carboni-Lindsey reaction between a polymer with two alkene groups per repeat unit and 2 mol % tetrazine monomer.

Scheme 9. Non-limiting reaction scheme for a Carboni-Lindsey reaction between a polymer with one alkene group per repeat unit and 2 mol % tetrazine monomer.

Scheme 10. Non-limiting reaction scheme for a Carboni-Lindsey reaction between a polymer with two alkyne groups per repeat unit and up to 200 mol % tetrazine monomer. This reaction can produce foams more vigorously in proportion to the amount of reagents.

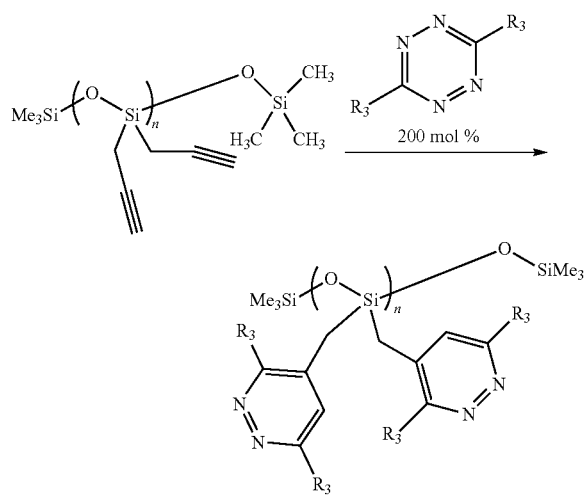

Scheme 11. Non-limiting reaction scheme for a Carboni-Lindsey reaction between a non-linear, branched siloxane (or silsesquioxane) and up to 100 mol % tetrazine monomer.

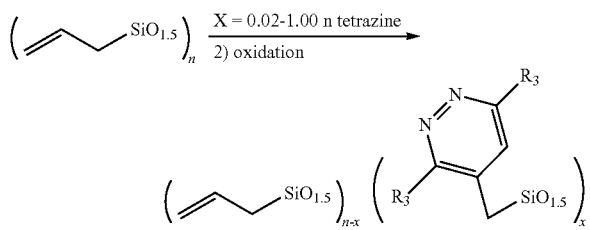

The following are exemplary synthetic procedures, and are included here as non-limiting examples only. Equivalents or substitutes are within the scope of the invention.

EXAMPLE 1: Formation of Organosilicon Polymer Foam from 3,6-Dischloro-1,2,4,5-Tetrazine, a Hydroxyl Substituted Polybutadiene and a Vinyl Terminated Polydimethylsiloxane (PDMS)

To a 20 mL plastic weighing cup was added polybutadiene hydroxyl terminated (0.500 g, 9.26 mmol) and polydimethylsiloxane (PDMS) vinyl terminated (listed Mw 25000) (0.067 g, 0.90 mmol). The mixture was blended with a glass stir rod until an opaque white paste was obtained. To this mixture, 3,6-dichloro-1,2,4,5-tetrazine (0.349 g, 2.31 mmol) was added and the reagents were blended into a thick orange paste using the glass stir rod. Almost immediately after mixing, the orange paste began foaming, and grew over the next 30 minutes to form a solid orange foam. The foam was left to cure at room temperature (24° C.) for 16 hours and changed to an orange brown color with a mass of 0.805 g. It was subsequently cured in a 60° C. oven for two hours yielding a brown foam with a final mass of (0.786 g). FT-IR (ATR, SiO$_2$): cm$^{-1}$=3233.49, 2962.18, 2918.62, 2850.93, 1678.87, 14445.97, 1413.75, 1378.36, 1310.52, 1259.87, 1079.94, 1019.01, 969.18, 913.88, 864.26, 744.03, 672.04, 626.64, 613.84, 590.90, 571.81, 551.73, 480.90, 446.72.

EXAMPLE 2: Formation of Organosilicon Polymer Foam from 3,6-Dischloro-1,2,4,5-Tetrazine and Polyallylsiloxane To a 10 mL glass vial was added, polyallylsiloxane (0.250 g, 2.45 mmol). The flask was cooled in an ice bath until it reached 0° C. before the addition of 3,6-dichloro-1,2,4,5-tetrazine (0.037 g, 0.24 mmol). The compounds were blended into an orange paste using a glass stir rod and allowed to foam for 10 minutes while maintaining an external temperature under 25° C., measured with an IR gun. After 10 minutes the foam was removed from the ice bath, and allowed to warm to 24° C. and cured at this temperature for 18 hrs to yield white foam containing orange unreacted tetrazine. The residual tetrazine was extracted with DCM, and the foam was dried at 24° C. for 2 hrs then at 90° C. for 2 hrs. After cooling, the off white/peach foam had a final mass of (0.251 g) and fluoresced blue/white under UV light. FT-IR (ATR, SiO$_2$): cm$^{-1}$=3262.81, 3079.09, 2977.21, 2894.48, 2732.04, 2652.23, 2582.06, 1679.13, 1634.35, 1418.62, 1389.72, 1372.03, 1296.04, 1266.03, 1179.11, 1094.09, 1032.09, 929.05, 901.98, 785.73, 758.19, 701.58, 627.82, 616.15, 561.84, 420.41.

EXAMPLE 3: Formation of Organosilicon Polymer Foam from 3,6-Dischloro-1,2,4,5-Tetrazine and Polyallylsiloxane To a 20 mL glass scintillation vial was added, polyallylsiloxane (0.500 g, 4.90 mmol). The flask was cooled in an ice bath until it reached 0° C. before the addition of 3,6-dichloro-1,2,4,5-tetrazine (0.148 g, 0.49 mmol). The compounds were blended into an orange paste using a glass stir rod and allowed to foam for 10 minutes while maintaining an external temperature under 25° C. by occasional removal from the ice bath. The external temperature was measured using a handheld IR gun. After 10 minutes the foam was removed completely from the ice bath, and allowed to warm to room temperature (24° C.) and cured at this temperature for 18 hrs to yield white foam containing orange unreacted tetrazine. The residual tetrazine was extracted with DCM, and the foam was dried at 24° C. for 2 hrs then at 90° C. for 2 hrs. After cooling, the off white/peach foam had a final mass of (0.477 g) and fluoresced under UV light, FT-IR (ATR, SiO$_2$): cm$^{-1}$=3257.28, 3081.11, 2977.84, 2920.55, 2897.32, 1680.62, 1634.21, 1418.70, 1390.72, 1366.49, 1322.18, 1268.61, 1178.64, 1095.48 1032.87, 929.04, 902.12, 786.15, 759.09, 700.42, 629.09, 570.94, 548.30, 496.31, 422.95.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A method of forming an organosilicon polymer foam, comprising;
   a. providing a siloxane polymer having at least one of an alkenyl or an alkynyl functional group;
   b. providing one or more tetrazine monomers, wherein the tetrazine monomers are 3,6-disubstituted-1,2,4,5-tetrazines; and
   c. mixing the one or more 1,2,4,5-tetrazine monomers with the siloxane polymer, wherein the tetrazine monomers react with the at least one of the alkenyl or alkynyl functional groups of the siloxane polymer to produce said organosilicon polymer foam.

2. The method of claim 1, wherein two or more of the tetrazine monomers are covalently linked by an organic functional group, an oligomer or a polymer chain.

3. The method of claim 1, wherein the tetrazine monomers react with the at least one of the alkenyl or alkynyl functional groups of the siloxane polymer via a Carboni-Lindsey reaction.

4. The method of claim 1, wherein the substituents at the 3 and 6 positions of the tetrazine monomers are each selected from the group containing alkyl, aryl, hydrogen, halide, heteroaromatic, ester, alkoxy, amine, amide, nitrile and sulfide substituents.

5. The method of claim 4, wherein the halide substituent is a fluorine, a chlorine, a bromine, or an iodine substituent.

6. The method of claim 1, wherein the tetrazine monomer is soluble in or miscible with the siloxane polymer.

7. The method of claim 1, wherein the foam is flexible or rubbery.

8. The method of claim 1, wherein the foam is formed at a temperature of about 20-25° C.

9. The method of claim 1, wherein the foam is fluorescent.

10. A modified organosilicon polymer prepared from:
    a. a siloxane polymer having at least one of an alkenyl or an alkynyl functional group; and
    b. one or more tetrazine monomers, wherein the tetrazine monomers are 3,6-disubstituted-1,2,4,5-tetrazines;
    wherein the tetrazine monomers react with the at least one of the alkenyl or alkynyl functional groups of the siloxane polymer to form said modified organosilicon polymer.

11. The modified organosilicon polymer of claim 10, wherein two or more of the tetrazine monomers are covalently linked by an organic functional group, an oligomer or a polymer chain.

12. The modified organosilicon polymer of claim 10, wherein the tetrazine monomers react with the at least one of the alkenyl or alkynyl functional groups of the siloxane polymer via a Carboni-Lindsey reaction.

13. The modified organosilicon polymer of claim 10, wherein the substituents at the 3 and 6 positions of the tetrazine monomers are each selected from the group containing alkyl, aryl, hydrogen, halide, heteroaromatic, ester, alkoxy, amine, amide, nitrile and sulfide substituents.

14. The modified organosilicon polymer of claim 13, wherein the halide substituent is a fluorine, a chlorine, a bromine, or an iodine substituent.

15. The modified organosilicon polymer of claim 10, wherein the tetrazine monomer is soluble in or miscible with the siloxane polymer.

16. The modified organosilicon polymer of claim 10, wherein the tetrazine monomer is not soluble in the siloxane polymer and a solvent is required for the reaction.

17. The modified organosilicon polymer of claim 10, wherein the modified organosilicon polymer is a polymer foam.

18. The modified organosilicon polymer of claim 17, wherein the foam is flexible or rubbery.

19. The modified organosilicon polymer of claim 17, wherein the foam is formed at a temperature of about 20-25° C.

20. The modified organosilicon polymer of claim 17, wherein the polymer foam is fluorescent.

* * * * *